United States Patent [19]

Cashmere et al.

[11] Patent Number: 4,921,877

[45] Date of Patent: May 1, 1990

[54] LIQUID NUTRITIONAL FORMULA FOR GLUCOSE INTOLERANCE

[75] Inventors: Karen A. Cashmere; Elizabeth M. Besozzi, both of Columbus, Ohio

[73] Assignee: Abbott Laboratories, Abbott Park, Ill.

[21] Appl. No.: 132,501

[22] Filed: Dec. 16, 1987

Related U.S. Application Data

[63] Continuation of Ser. No. 923,525, Oct. 27, 1986, abandoned.

[51] Int. Cl.$^5$ .................. A61K 31/195; A61K 31/20; A61K 31/70; B29D 19/00
[52] U.S. Cl. .................................. 514/866; 426/801; 514/904
[58] Field of Search ................ 424/128; 514/866, 904, 514/602

[56] References Cited

U.S. PATENT DOCUMENTS

| | | | |
|---|---|---|---|
| 4,419,369 | 12/1983 | Nichols, Jr. et al. | 426/2 |
| 4,497,800 | 2/1985 | Larson et al. | 424/157 |
| 4,544,550 | 10/1985 | Rodolfo | 424/127 |
| 4,690,820 | 9/1987 | Simko | 514/2 |

FOREIGN PATENT DOCUMENTS

2142340 1/1985 United Kingdom ............... 426/801

OTHER PUBLICATIONS

Heymsfield et al., "Respiratory Cardiovascular, and Metabolic Effects of Enteral Hyperalimentation: Influence of Formula Dose and Composition", Am. Journal of Clinical Nutrition, 40, Jul. 1984, p. 116–130.
Bland, *Octacosanol, Carnitine and Other "Accessory" Nutrients*, pp. 6–9, 1982.
Dican, *Trace Minerals*, pp. 14–19 (1984).
Passwater, *GTF Chromium*, pp. 8–21 (1982).
Campbell, *Diabetes and the Pharmacist*, 2nd Ed., p. 42 (1986).
*Physician's Desk Reference for Non-Prescription Drugs*, 6th Ed. (1985), pp. 513, 593.
*Physician's Desk Reference*, 41 ED (1987), pp. 1735–1736.

*Primary Examiner*—Dale R. Ore
*Attorney, Agent, or Firm*—Donald O. Nickey; Edward H. Gorman, Jr.; Steven R. Crowley

[57] ABSTRACT

An improved nutritionally complete formula containing a unique fiber-containing carbohydrate blend, at a relatively low concentration; a unique fat blend, at a relatively high concentration; protein; carnitine; myoinositol; vitamins and minerals, including chromium. This formula is for the dietary management of patients with glucose intolerance.

8 Claims, No Drawings

LIQUID NUTRITIONAL FORMULA FOR GLUCOSE INTOLERANCE

This is a continuation of application Ser. No. 923,525, filed Oct. 27, 1986, now abandoned.

FIELD OF THE INVENTION

The invention relates to improved enteral nutritional formulas and more particularly to formulas which provide protein, low carbohydrate, high fat, dietary fiber and micronutrients specific to the needs of glucose intolerant individuals.

BACKGROUND OF THE INVENTION

Primary treatment for glucose intolerance is strict adherence to a diet which minimizes postprandial glucose response, and in many cases, use of medications (insulin or oral hypoglycemic agents). The American Diabetes Association (ADA) currently recommends a diet in which protein accounts for 12-20% total calories (kcal), carbohydrate for 50-60% kcal, and fat for the remaining kcal (about 30%). *Diabetes Care* 2:250-253, 1979. The ADA also recommends consumption of complex carbohydrates that are high in dietary fiber (40 g/day for men, 25 g/day for women), and consumption of fats that are low in cholesterol ($<300$ mg/day) and low in saturated fatty acids (polyunsaturated fatty acids : saturated fatty acids or P:S ratio=1 or greater), *Diabetes Outlook* 21:1-8, 1986.

Most currently available liquid enteral formulas comply, for the most part, with the ADA recommendations. One such enteral formula sold by Fresenius Diatetik, Bad Homburg, West Germany under the name Diabetiker-Flussignahrung, contains 43% kcal as carbohydrate, 37% as fat and 20% kcal as protein. Enteral formulas commonly used in patients with glucose intolerance in the United States include Compleat® nutritional formula (Sandoz Nutrition, Minneapolis, Minn.), which contains 16% kcal as protein, 48% kcal as carbohydrate, 36% kcal from fat, and dietary fiber from fruits and vegetables, Enrich® nutritional formula (Ross Laboratories, Columbus, Ohio), which contains 14.5% kcal as protein, 55% kcal as carbohydrate, 30.5% kcal as fat, and dietary fiber from soy polysaccharide and Osmolite® nutritional formula (Ross Laboratories, Columbus, Ohio) which contains 14.0% kcal as protein, 54.6% kcal as carbohydrate and 31.4% kcal as fat.

The primary problem in following the ADA guidelines with liquid diets is that these formulas empty rapidly from the stomach and are absorbed very efficiently in the upper segments of the small bowel. Stevens et al, *JPEN* 3:32, 1979, have shown that 66% each of a 500 kcal feeding of Osmolite nutritional formula and two other enteral formula diets emptied from the stomach in one hour, and that 95% of each feeding empties in two hours. This is at least twice as fast as the emptying rate of an isocaloric solid food meal.

Because of the rapid emptying rate of liquid nutritional formulas, rapid absorption of their carbohydrate sources also occurs, which increases potential for hyperglycemia in patients with glucose intolerance. Cashmere et al, *Fed Proc* 43:392, 1984, have shown that blood glucose response from a 500 kcal feeding, each, of Compleat and Enrich nutritional formulas peaks in only 30 minutes in healthy volunteers. This is as rapid as the absorption rate of free glucose. Additionally, a study conducted at the University of Chicago, by Dreutzler et al, (unpublished), has shown that 5 day consumption of Enrich nutritional formula as the sole source of nutrition resulted in an elevated glucose response curve in patients with Type II diabetes mellitus; following 5 day consumption of the diet, peak glucose response was 5% higher than baseline, and integrated area under the glucose response curve was almost 8% higher than baseline. Data from these studies indicate that the current ADA dietary guidelines are inappropriate for liquid nutritional diets.

Several studies have shown that manipulation of certain dietary components may be beneficial to glucose intolerant individuals. For example, fructose is known to be more slowly absorbed than glucose and has been reported to lower postprandial blood glucose and insulin response. Koivistoinen et al, *Carbohydrate Sweeteners in Foods and Nutrition*, Academic Press, London, 1980. Dietary fiber has been reported to lower posprandial glucose response in patients with diabetes. Kay et al, *Diabetologia* 20:18-21, 1981.

One study has suggested adding myoinositol to the diet of diabetic patients in order to prevent decreases in tissue myoinositol which are common in patients having diabetes mellitus and result in deranged sodium potassium ATPase regulation which produces a functional derangement within nerves, retina and glomerulus. *Diabetic Outlook* 21:2, 1986. The amino acid carnitine has been reported to reduce serum lipids, triglycerides, cholesterol and fatty acids in patients with diabetes mellitus. Abdel-Aziz et al, *Nutr. Reports International* 29:1071-1079, 1984. Chromium is known to function as a component of an organic complex with nicotinic acid and amino acids to form glucose tolerance factor required to maintain glucose homeostasis. Wallach, *J. Amer. Coll. Nutr.* 4:107-120, 1985.

SUMMARY OF THE INVENTION:

The present invention is an improved nutritionally complete enteral formula for the dietary management of patients with hyperglycemia, such as those with diabetes mellitus or stress-induced hyperglycemia. The improved formula is comprised of about 33% kcal as carbohydrate, about 50% kcal as fat, and about 17% kcal as protein, and further contains a unique carbohydrate blend (low DE corn starch, fructose, and soy polysaccharide), and a unique fat blend (high oleic safflower oil and soy oil) which are also beneficial to the dietary management of patients having a glucose intolerance. The formula meets 100% of the U.S. R.D.A. for vitamins and minerals in about 1400 kcal, and further contains chromium, selenium, molybdenum, myoinositol and carnitine. The invention overcomes the primary complication, severe hyperglycemia, associated with the use of previous enteral diets in patients with glucose intolerance. If uncorrected, hyperglycemia can result in dehydration, coma and ultimately death in these patients.

DETAILED DESCRIPTION OF THE INVENTION

The fat source for the-diabetic formula may be any fat source or blend of fat sources which provides the desired levels of saturated (less than 10% kcal), polyunsaturated (up to 10% kcal), monounsaturated fatty acids and alpha linolenic acid (0.5 to 1.0% kcal) including soy oil, olive oil, marine oil, high oleic sunflower or safflower oil, or cottonseed oil. Preferably the fat source is 10-15% unhydrogenated soy oil and 85-90% high oleic safflower oil. The amount of fat in the product may from 45-60% of the total calories of the formula. Preferably, the fat comprises approximately 50% of the total calories of the formula. An emulsifier is used to aid the stabilization of the high fat formula. The emulsifier may be any suitable fat emulsifier such as mono- and diglycerides, egg lecithin or soy lecithin. The preferred emulsifier is soy lecithin.

The carbohydrate source of the formula may be fructose, xylitol, corn syrup or hydrolyzed cornstarch. Acceptable carbohydrate sources for the present formula are 20-67% of total carbohydrate as fructose or xylitol with the remainder of the carbohydrate having a dextrose equivalent (D.E.) from about 5-25. The preferred carbohydrate source is 20-43% fructose and 35-60% corn syrup solids having a D.E. of 5-25. However, the percent of fructose and corn syrup solids of total carbohydrate is not critical so long as the percent carbohydrate of total calories is low (i.e., 20-37%).

Another component of the carbohydrate system of the high fat, low carbohydrate diabetic formula is dietary fiber which comprises 20-35% of the carbohydrate, preferably at a level of approximately 20% of the carbohydrate. Soy polysaccharide is the preferred source.

The amount of carbohydrate present in the formula may range from about 20-37% of the total calories of the formula. Preferably the carbohydrate comprises approximately 33% of the total calories of the formula.

Artificial sweeteners could also be used in the present formula to enhance the organoleptic quality of the formula. Examples of suitable artificial sweeteners include saccharine and aspartame.

The protein source for formula may be any suitable source for a nutritional formula such as casein, whey or soy protein. The preferred source for the present formula is sodium caseinate and sodium calcium caseinate. The protein source of the formula may be provided in the range of about 8% to about 25% of the total calories and is preferably provided as about 17% of the total calories of the formula.

To minimize the effect of the soy polysaccharide on the viscosity of the high fat, low carbohydrate formula and to minimize Maillard browning caused by the fructose and hydrolyzed corn starch in the formula while maintaining stability of the protein, pH control is used during the preparation of the formula.

The formula contains chromium at levels between 50 and 400 mcg per 1422 kcal, with a preferred level of approximately 200 mcg per 1422 kcal. Suitable sources of chromium include chromium yeast, chromium acetate and chromium chloride. The preferred source is chromium chloride.

The formula also contains myoinositol at levels of approximately 1200 mg/1422 kcal and L-carnitine at approximately 200 mg/1422 kcal.

Table 1 contains the preferred ingredients by amount per liter of the formula.

TABLE 1

| Ingredients | Per Liter (1000K calories) Preferred Amount |
|---|---|
| Water | 834.75 grams |
| Soy oil | 5.28 grams |
| High oleic Safflower Oil | 48.11 grams |
| Sodium Caseinate | 30.17 grams |
| Sodium Calcium Caseinate | 16.24 grams |
| Corn Syrup solids (D.E. 20) | 33.29 grams |
| Fructose | 37.41 grams |
| Soy Polysaccharide | 21.10 grams |
| Soy Lecithin | 2.17 grams |
| Magnesium Chloride | 2.05 grams |
| Sodium citrate | 2.01 grams |
| Tricalcium Phosphate (micronized) | 1.54 grams |
| Potassium Chloride | 1.24 grams |
| Potassium Citrate | 1.01 grams |
| Ascorbic Acid | 509.76 mgs |
| Myo-Inositol | 957.00 mgs |
| Choline Chloride | 584.90 mgs |
| Dipotassium Phosphate | 453.17 mgs |
| L Carnitine | 159.60 mgs |
| Trace Minerals | 114.40 mgs |
| Ferrous Sulfate | |
| Zinc Sulfate | |
| Cupric Sulfate | |
| Manganous Sulfate | |
| Oil Soluble Vitamins | 58.00 mgs |
| Alpha-Tocopherol Acetate | |
| vitamins A Palmitate | |
| Phylloquinone | |
| Vitamin D3 | |
| Water Soluble Vitamins | 78.98 mgs |
| Thiamine Chloride Hydrochloride- | |
| Riboflavin | |
| Calcium Pantothenate | |
| Folic Acid | |
| Biotin | |
| Cyanocobalamin | |
| Pyrodoxine Hydrochloride | |
| Chromium Chloride | 828.60 mcgs |
| Sodium Selenite | 154 mcgs |
| Sodium Molybdate | 534.4 mcgs |

The following is an example processing method for the nutritional formula of the invention:

I. Preblends

The following mixtures are blended separately:

A. Protein Oil Blend

In this preblend, 7.34 lb. of high oleic safflower oil and 0.805 lb. of soy oil are placed in a mixing kettle and heated while agitating to a temperature range of 130°-160° F. with a preferred range of 140°-150° F. To the heated oils 149.9 grams of soybean lecithin emulsifier are added and agitated until dissolved. Next 3.8 grams of oil soluble vitamins A, D3, E and K1 are added and agitated thoroughly. A temperature range of 130°-150° F. is maintained until the oil blend is used. It should be noted that the oil blend should be used within 12 hours of the time it is made to prevent rancidity of the oil and loss of the oil soluble vitamins' potency.

To this oil blend, 3.38 lb. of sodium caseinate is added with agitation. This slurry must be held for a minimum of ten minutes at 130°-150° F. with agitation to allow dissolution of the protein before proceeding.

B. Carbohydrate Mineral Solution In a mixing kettle 7.73 lb. of filtered tap water are heated to a temperature of 135°-175° F. with a preferred temperature range of 150°-160° F. The following minerals are added to the heated water and agitated until dissolved:

| | |
|---|---|
| Magnesium Chloride 6 H20 | 134.3 grams |
| Potassium Chloride | 8.1 grams |
| Sodium Citrate 2 H20 | 131.9 grams |

| | |
|---|---|
| Potassium Citrate H20 | 65.8 grams |
| Minerals: | 7.5 grams |
| Ferrous Sulfate 7 H20 | |
| Zinc Sulfate 7 H20 | |
| Copper Sulfate 5 H20 | |
| Manganese Sulfate H20 | |
| Tricalcium Phosphate, micronized | 100.9 grams |
| Chromium Chloride 6 H20 | 54.2 mgs. |
| Sodium Selenite | 10.5 mgs. |
| Sodium Molybdate 2 H20 | 36.7 mgs. |
| Dipotassium Phosphate | 29.7 grams |

After the minerals are dissolved 5.47 lb. of 20 D.E. hydrolyzed cornstarch are added to the mineral slurry under agitation. After the hydrolyzed cornstarch has dissolved, 5.45 lb. of fructose are added and dissolved. The pH of the slurry is then adjusted to a range of 6.30 to 7.0 with a preferred range of 6.30 to 6.55 using 1 Normal citric acid to decrease the pH or 1 Normal potassium hydroxide to increase the pH. This pH range is desirable as it minimizes the browning of the fructose and improves the aesthetic and organoleptic characteristics of the final product. The slurry is held at the preferred range of 130°-145° F. under agitation until used.

C. Protein Fiber Slurry

In a mixing kettle 59.62 lb. of filtered tap water is heated to 130°-170° F. with a preferred range of 150°-160° F. to enhance protein solubility. The specified amounts of dry ingredients are dry blended by hand and slowly added to the heated water with agitation:

| | |
|---|---|
| Sodium Caseinate | 1.19 lb. |
| Sodium Calcium Caseinate | 2.46 lb. |
| Soy Polysaccharide | 3.19 lb. |

This mix is maintained at the preferred temperature range of 150°-160° F. while agitating for twenty minutes to allow hydration of the caseinates and the soy polysaccharide. After twenty minutes of agitation, the pH of this mix is adjusted to 6.30 to 7.00 with a preferred range of 6.30-6.55. This range of 6.30 6.55 is desirable to minimize the viscosity of this slurry as well as that of the final product while avoiding denaturation and subsequent insolubility of the protein which occurs at pHs below 6.30. 45% potassium hydroxide is used to increase the pH and 1N citric acid is used to decrease the pH. Addition of either 45% potassium hydroxide or 1 N citric acid must be done very slowly to avoid localized "burning" or denaturation of the protein. This mix is maintained at the preferred temperature range of 150°-160° F. under agitation until used. This slurry must be used within two hours of its preparation to avoid microbial growth.

II. Blending

The Carbohydrate Mineral slurry is added to the Protein Fiber slurry under constant agitation. The Protein Oil blend is immediately added while agitating. While maintaining a preferred temperature of 130°-150° F., the mixture is agitated for a minimum of ten minutes. After at least ten minutes of agitation, the pH of the mixture is adjusted to 6.30-7.0 with a preferred range of 6.30-6.55 using 1N citric acid to decrease the pH or 1N potassium hydroxide to increase the pH. The pH of 6.30-6.55 is desirable to minimize the Maillard browning reaction between the protein and the fructose and to minimize the viscosity of the mixture induced by the soy polysaccharide.

III. Homogenization and Pasteurization Procedure

The blended mix is heated to a temperature range of from 145°-175° F. with a preferred range of from 155°-165° F. through a plate or coil heater, then pumped through a deaerator with a vacuum range of from 8 inches to 17 inches of mercury with a preferred range of from 10 inches to 15 inches of mercury. The blended mix is emulsified in a single stage homogenizer at a pounds per square inch (PSIG) range of from 700-1200 PSIG with a preferred range of from 980-1100 PSIG. The blended mix is then homogenized in a dual stage homogenizer at a first stage PSIG range of from 3500-4200 PSIG with a preferred PSIG range of from 3900-4200 PSIG and a second stage PSIG range of from 250-700 PSIG with a preferred PSIG range of from 400-600 PSIG. The mix passes through a hold tube with a 16 second hold time at a temperature range of from 165°-190° F. with a preferred temperature range of from 165°-175° F. This step constitutes high temperature short time (HTST) pasteurization. The mix is pumped through a plate cooler to assure a product temperature range of from 34°-48° F. with a preferred product temperature range of from 39°-44° F. From the cooler board, the mix is pumped into a refrigerated hold tank capable of maintaining the preferred product temperature with constant agitation.

IV. Water Soluble Vitamin Solution

In a mixing kettle three lbs. of filtered tap water are maintained at a temperature range of 40°-90° F. with a preferred temperature range of 60°-80° F. The required amounts of the following ingredients are added to the water with agitation:

| | |
|---|---|
| All remaining Water Soluble Vitamins | 5.2 grams |
| Ascorbic Acid | 33.4 grams |
| Choline Chloride | 38.3 grams |
| L-Carnitine | 10.4 grams |
| Myoinositol | 62.6 grams |

When all ingredients are dissolved the pH of the vitamin solution is adjusted to 5.5 to 10 with a preferred range of 6.0-7.0 using 1N citric acid to decrease the pH or 1N potassium hydroxide to increase the pH. After an acceptable pH is attained, all of the vitamin solution is slowly added to the processed mix in the hold tank with constant agitation. It should be noted that the pH range of the vitamin solution is critical as a low pH will cause denaturation of the protein in the product and a high pH will facilitate browning in the product and may allow development of high viscosity.

V. Flavor System

In a mixing kettle, 2.5 lbs. of filtered tap water are maintained at a temperature range of 40°-90° F. with a preferred temperature range of 60°-90° F. 136 grams of vanilla flavor is added to the water and agitated to dissolve before slowly adding to the tank with agitation. Other suitable flavors could be added to provide variety and to improve organoleptic acceptability.

VI. Final Product Total Solids Adjustment 47 lbs. of filtered water are added to the blended mix in the hold tank with a constant agitation in order to assure a total solids range from 17–23% with a preferred total solids range from about 19–20%.

VII. Filling and Sterilization

Containers such as cans or glass bottles are filled with the liquid formula and sterilized according to FDA guidelines. While the high fat, low carbohydrate formula is preferably provided in a Ready to Feed form, it may also be concentrated by increasing the total solids or spray dried to powder form by procedures which are well known to those skilled in the art. The concentrate or powder are then reconstituted for feeding by adding water.

The following examples indicate that prototypes of the inventive nutritional formula improves the postprandial glucose response of patients having type II diabetes mellitus, as reflected by a decreased peak glucose response and a decreased integrated area under the glucose response curve when compared to that from liquid formula diets that comply with ADA guidelines.

EXAMPLE I

Nine male and three female subjects, 36 to 67 years old, with Type II diabetes mellitus were studied to determine whether lowering the level of carbohydrate in enteral formulas will improve postprandial serum glucose response, and to determine the effects of soy polysaccharide fiber on serum glucose response in formulas containing either low or moderate levels of carbohydrate. To accomplish these objectives, each subject was given 75 g glucose tolerance test solution and was randomly assigned to receive four meal tolerance tests: (1) 500 kcal Diet A (28.1% kcal as carbohydrate, 55.2% kcal as fat, 16.7% kcal as protein); (2) an example of the formula of the invention which contains 500 kcal Diet A with soy polysaccharide (10 g); (3) 500 kcal Diet B (53.3% kcal as carbohydrate, 30% kcal as fat, 16.7% kcal as protein), and (4) 500 kcal Diet B with soy polysaccharide (10 g). Each subject received all four products, with 3–7 day intervals between products. Six subjects were on oral hypoglycemic agents, but none were provided prior to the 75 g glucose tolerance test solution. During all other test periods, the six subjects on oral agents received their usual drug at the usual dose prior to initiation of the meal tolerance tests.

Both Diet A formulations resulted in a relatively flat postprandial glucose response curve. Peak glucose response was only 28 mg above fasting with the inventive formula (Diet A with fiber), and 31 mg above fasting for Diet A. This was a significant improvement in glucose response compared to that from the Diet B products; peak glucose response from Diet A with Fiber was 61% lower than that from Diet B with Fiber, and peak response from Diet A was 66% lower than that from Diet B ($P<0.0001$). Integrated area under the glucose response curve from the two Diet A formulations was also lower than that from the two Diet B formulations. Diet A with Fiber resulted in a total area under the glucose response curve that was 53% less than that from Diet B with Fiber, and Diet A resulted in an area under the curve that was 54% less than that of Diet B ($P<0.0001$).

Lowering the level of carbohydrate in enteral formula diets also has a positive effect on insulin response. Peak insulin response from Diet A with fiber was only 22.2 uU above fasting, and that from Diet A only 24.9 uU above fasting. This was 40% lower than the insulin response for that from Diet B with fiber, and 33% lower than that from Diet B ($P<0.0005$). There were no differences in time to insulin peak among the four diets. However, Diet A with fiber of the invention resulted in a total area under the insulin response curve that was 37% lower than that of Diet B with fiber ($P<0.0008$).

EXAMPLE II

A screening study was conducted to evaluate the acute effects of low-carbohydrate, xylitol-containing enteral formula diets on blood glucose and insulin response in 4 male and 5 female subjects, 44–66 years old, with Type II diabetes mellitus. Each subject was randomly assigned to receive a 70 g glucose tolerance test solution and five 500 kcal servings of the following diets containing two caloric distributions: Diet 1=20% kcal as protein, 25% kcal as carbohydrate, 55% kcal as fat with xylitol as 45% of total carbohydrate; Diet 2=20% kcal as protein, 40% kcal as carbohydrate, 40% kcal as fat with xylitol as 45% of total carbohydrate; Diet 3=Diet 1 with xylitol as 66.7% of total carbohydrate; Diet 4=Diet 2 with xylitol as 66.7% of total carbohydrate; and Diet 5=Ensure HN nutritional formula from Ross Laboratories, Columbus, Ohio served as the control diet. Each subject received all five diets and the 70 g glucose tolerance test solution, with a three-to-seven day interval between tests.

Results indicated that the lower the level of carbohydrate, the flatter the postprandial glucose response curve regardless of the level of xylitol contained in the formulas. Thus, the level of carbohydrate has more of an effect on postprandial glucose response than the type of carbohydrate. Peak glucose response was only 26 mg/dL above fasting from the 25% carbohydrate/67% xylitol diet and 35 mg/dL above fasting from the 25% carbohydrate/45% xylitol diet, a significant improvement ($P<0.02$) compared to that from Ensure HN (peak response: 98 mg/dL above fasting). Although peak glucose response from the diets containing 40% kcal as carbohydrate was also less than that from Ensure HN, results were not statistically significant. However, because of the magnitude of the difference (43%–46% less than that from Ensure HN) practitioners would likely consider the difference to be clinically significant. Likewise it is possible that the results would have reached statistical significance with a larger number of subjects.

All four low-carbohydrate diets tended to result in a lower glucose response than Ensure HN at every time interval evaluated. As such, total area under the glucose response curve from the four low carbohydrate diets was lower ($P<0.0001$) than that from Ensure HN. Total area under the glucose response curve ranged from 46% below that of Ensure HN (40% carbohydrate:45% xylitol) to 59% lower than that from Ensure HN (25% carbohydrate:45% xylitol).

There were no statistical differences in serum insulin response among diets at any time interval evaluated. This may be attributed to insulin resistance, which is common in patients with Type II diabetes mellitus, particularly since patients withheld their oral agents the morning of the glucose tolerance test.

Examples I and II show that lowering the level of carbohydrate in enteral formulas helps improve postprandial glucose response in patients with Type II diabetes mellitus.

What is claimed is:

1. A liquid nutritionally complete enteral formula for the dietary management of patients with glucose intolerance characterized in that:

(a) 8–25% of total caloric value is obtained from protein;
(b) 20–37% of total caloric value is obtained from a carbohydrate blend wherein said carbohydrate blend comprises corn starch, fructose and soy polysaccharide;
(c) 45–60% of total caloric value is obtained from a fat blend and wherein less than 10% of total formula calories is derived from saturated fatty acids, up to 10% of total formula calories from polyunsaturated fatty acids and the balance of fat calories from monounsaturated fatty acids;
(d) at least the minimum U.S. RDA for vitamins and minerals;
(e) effective amounts of the ultratrace minerals chromium, selenium, and molybdenum; and
(f) effective amounts of carnitine, taurine and myo-inositol.

2. The liquid nutritional according to claim 1 wherein the carbohydrate blend is 20–43% fructose, 20–35% soy polysaccharide and 35–60% hydrolyzed cornstarch.

3. The liquid nutritional according to claim 2 wherein the corn starch has a dextrose equivalent of about 20.

4. The liquid nutritional according to claim 2 wherein the amount of soy polysaccharide is about 25–30% of total carbohydrates.

5. The liquid nutritional according to claim 2 wherein protein is about 17%, carbohydrate is about 33% and fat is about 50%.

6. The method of claim 1 wherein the caloric distribution of the formula comprises about 50% fat, 33% carbohydrate and 17% protein.

7. The method of claim 1 wherein the hydrolyzed cornstarch has a dextrose equivalent of about 20.

8. The method of claim 1 wherein the fat comprises about 10–15% soy oil with the remainder of the fat comprising high oleic safflower oil.

* * * * *